Patented July 1, 1947

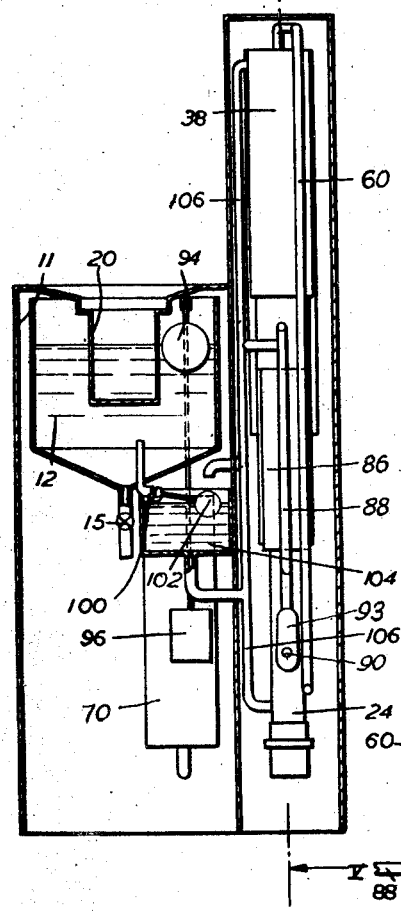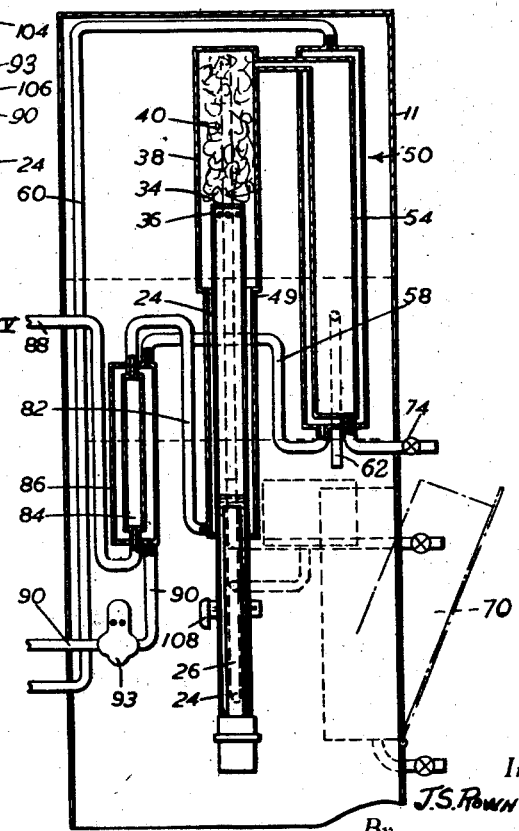

2,423,205

UNITED STATES PATENT OFFICE 2,423,205

STILL WITH VAPOR SEPARATOR

Joseph Seebohm Rowntree, Radnage, near High Wycombe, England

Application February 4, 1944, Serial No. 521,073
In Great Britain February 2, 1943

4 Claims. (Cl. 202—197)

Solvents such as kerosene, white spirit, carbon tetrachloride and others are commonly used in engineering works for cleaning oily or greasy articles such as machine parts and after use they are collected and cleaned for further use by filtering or centrifuging, which removes the solid impurities. In course of time, however, the oil and grease remaining in solution accumulate until finally the liquid is of no further use for cleaning.

The dissolved oil and grease can be removed by distillation, but hitherto no suitable form of still has been available which could be operated in the works where the solvent is used. The present invention aims at remedying this deficiency by providing a simple, inexpensive still unit capable of operating without attention and in a continuous manner—that is to say, so long as liquid to be distilled is supplied to it, it will continue to distil it and deliver the two components—the purified solvent and the mixture of oils and grease—through two separate delivery pipes.

The primary object of the present invention is to provide apparatus for the distillation of solvents from cleaning liquid contaminated with substances such as oil, grease and soft dirt which is viscous in solution and not readily vaporized.

Another object of the invention is to provide simple and comparatively inexpensive apparatus for the distillation of clean liquid from contaminated liquid, which apparatus can readily be modified according to the nature of the liquid and the contaminating substance therein.

A further object of the invention is to provide a still which can be used to distil clean liquid from liquid containing material such as heavy oils and grease which separates from the vaporized liquid in the form of froth, foam and scum.

A more specific object of the invention is to provide a still comprising, in combination, a receiving tank for the liquid to be distilled, a hollow heating column provided with at least one overflow aperture in its upper part, a heating element within said column for heating and evaporating liquid fed into said column, a hollow separating column of larger cross-sectional area than that of said heating column, said separating column being closed at its ends and arranged with its lower part surrounding said upper part of said heating column and said overflow apertures, so that the vaporized liquid flows through said apertures and upwards into said separating column and liquid residue flows through said apertures and collects in the lower part of said separating column, a pipe for conveying liquid from said tank to said heating column, an outlet for the liquid residue in the lower part of said separating column, a condenser for the vaporized liquid, a pipe connecting said condenser to said separating column, and means for automatically controlling the rate of flow of liquid to the heating column proportionately to the rate at which the liquid is evaporated from said column.

Yet another object of the invention is to provide a still comprising, in combination, a receiving tank for the liquid to be distilled, a hollow heating column closed at its ends and formed with at least one overflow aperture in the upper part thereof, an electrical heating element set within said heating column for heating and evaporating liquid fed into said column, a switch controlling said element, a hollow separating column closed at its ends and of larger cross-sectional area than that of said heating column, said separating column being arranged with its lower part surrounding said upper part of said heating column and the overflow aperture therein, so that the evaporated liquid flows through said overflow aperture and upwards into said separating column and the liquid residue flows through said overflow aperture and drains downwards to collect in the lower part of said separating column, an outlet for the liquid residue in the lower part of said separating column, a float valve in said tank controlling said switch, a pipe for conveying liquid from said tank to said heating column, means in said pipe for automatically controlling the rate of flow of said liquid to said heating column proportionately to the rate at which it is evaporated from said heating column, a condenser for the vaporized liquid, and a pipe to lead the vaporized liquid from said separating column to said condenser.

Referring to the accompanying drawings:

Figure 4 is an elevation, partly in section, of an alternative form of apparatus; and Figure 5 is a section on the line V—V of Figure 4.

Figure 1:
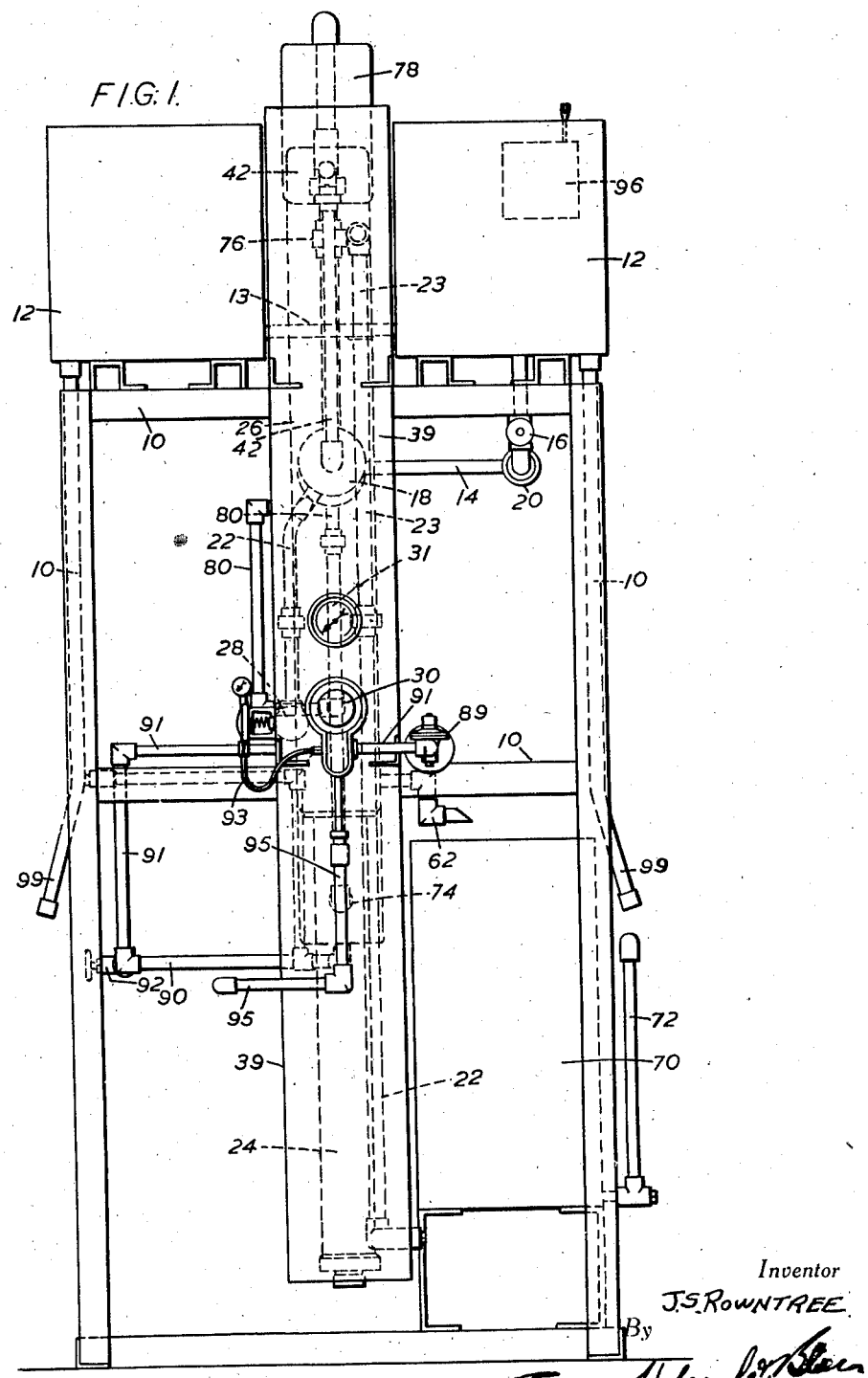
Figure 1 is a front elevation of one form of apparatus according to this invention.
Figure 2:
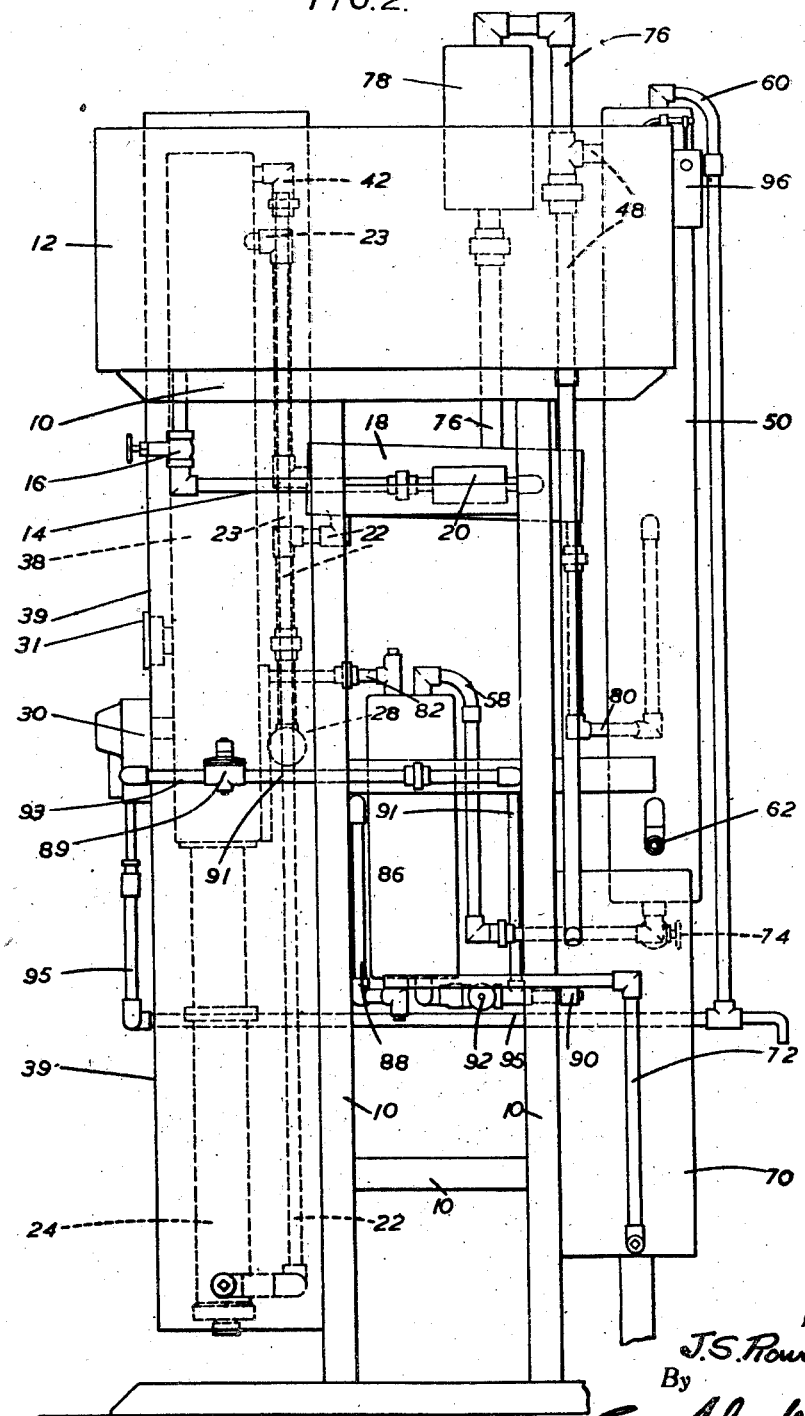
Figure 2 is a side elevation as seen from the right in Figure 1.
Figure 3:
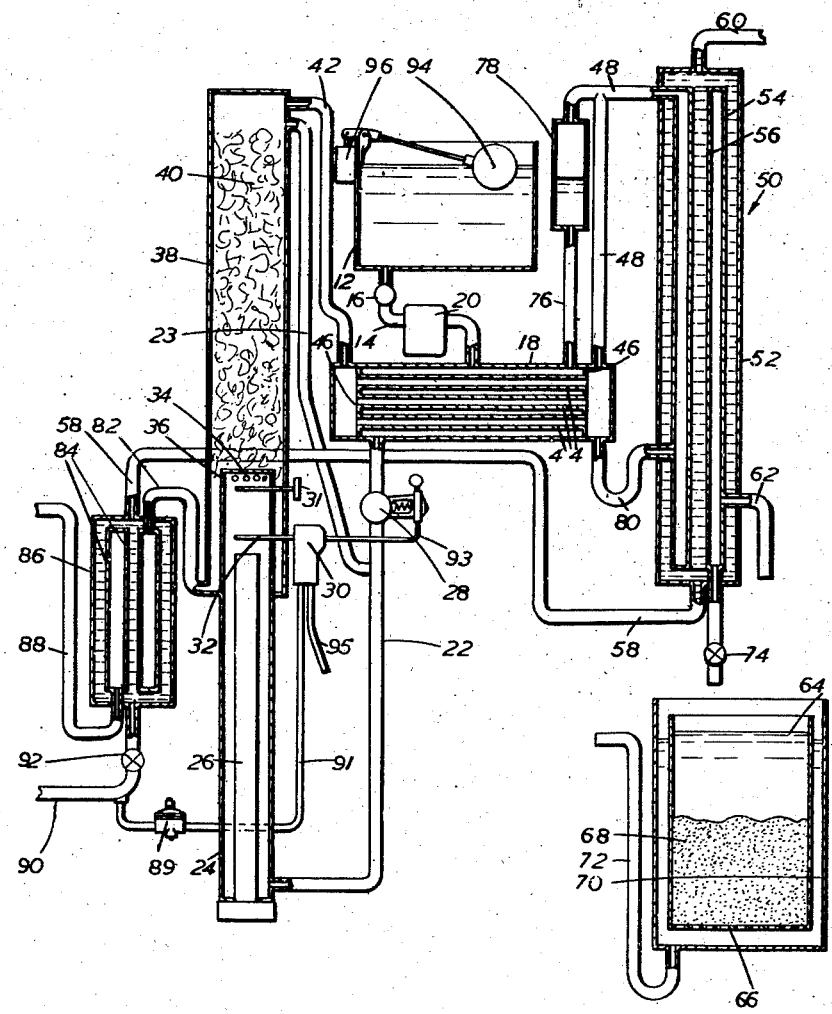
Figure 3 is a diagram illustrating the mode of operation of the apparatus.

Referring first to Figures 1 to 3, the various parts of the apparatus are supported on a stand 10 built up of angle steel, this stand being about five feet high and three feet wide. On the top of this stand is a receiving tank 12, divided for convenience into two sections connected by a pipe 13, into which the contaminated solvent is poured. From this tank the liquid flows through a pipe 14 provided with a stopcock 16 to a pre-heater 18, a strainer 20 being interposed to remove solid impurities. From the pre-heater 18, which will be described hereinafter, the solvent flows through a pipe 22 to the lower end of the heating column 24, which is a tube about 3½" diameter and about three feet long. Within the heating column 24 is an electric heating element 26 of the multi-leaf immersion type. This heating element terminates some distance below the upper end of the heating column. A regulating valve 28 in the pipe 22 is controlled by a thermostatic control unit 30, the temperature responsive element 32 of which is in the heating column just above the top of the heating element 26. The control unit 30 causes the valve 28 to open when the temperature in the heating column rises and to close, but not completely, when the temperature falls.

The upper end of the heating column 24 is closed by a disc 34 and a ring of holes 36 is provided around the upper margin of the heating column through which liquids and vapour may escape.

About one quarter of the length of the heating column at the top is situated concentrically within the lower part of a separating column 38 of somewhat larger diameter than the heating column and closed at both ends. The greater part of the length of the separating column 38 is filled with a packing 40 of steel turnings, Lessing rings, or other devices to entrap spray from the boiling liquid in the heating column and allow it to drain back into the heating column. A branch 23 from the pipe 22 leads to the top of the separating column, this branch serving to equalise pressure above and below the heating column, thereby preventing surging.

The upper end of the separating column 38 communicates through a pipe 42 with the pre-heater 18, in which hot vapour from the separating column gives up some of its heat to the solvent entering the pre-heater from the tanks 12. This pre-heater 18 consists of a drum closed at both ends and provided internally with tubes 44 fixed at their ends in partitions 46 spaced away from the ends of the drum. The pipe 42 leads into the space at one end of the drum between the end cover and one of the plates 46, the vapours, therefore, passing along the tubes 44 into the space at the other end of the drum. From this space a pipe 48 leads upwards to the upper end of a water cooled condenser 50 consisting of a cylindrical casing 52 arranged vertically and two tubes 54, 56, one within the other, the inner tube 56 being open top and bottom so that it communicates freely with the space within the casing 52, while the space between the tubes 54, 56 is closed top and bottom, as shown in Figure 3. This space receives the solvent vapour from the pipe 48. Water is circulated upwardly through the casing 52 and the tube 56 through pipes 58, 60. Condensed solvent is led off from the condensing element consisting of the tubes 54, 56 at a point a few inches above its lower end through a delivery pipe 62, and discharges into an absorbing unit consisting of a drum 64 having a bottom 66 of perforated metal or wire gauze and containing a mass 68 of granular material having absorbent and adsorbent properties, for example, activated charcoal, silica gel, or the like. This material removes acids, colouring matter, and traces of constituents having an unpleasant odour.

The drum 64 is supported within a tank 70, which receives the treated solvent, and from which it is removed through a pipe 72. A drainage cock 74 is provided at the lower end of the condensing element 54, 56 through which water that may have distilled over may be drained.

Some of the lighter constituents of the solvent may be vaporized in the pre-heater 18. These vapours escape through a pipe 76 into the pipe 48 at the top, the pipe 76 being provided with an enlargement 78 constituting a trap which allows liquids to fall and vapours to rise. Some of the vapour entering the pre-heater may be condensed and this condensate is led through a pipe 80 into the lower part of the condensing element 54, 56.

It will be clear that the still will continue to operate so long as liquid is maintained in the tanks 12, and that the temperature of the liquid in the heating column at its hottest point, just above the heating element 26, will be maintained constant or approximately so because if the temperature at these points should rise the regulating valve 28 opens further to increase the rate of flow of the solvent into the heating column. Conversely, if the temperature should fall the regulating valve 28 is automatically closed further to reduce the rate of flow of the solvent. A thermometer 31 enables the temperature inside the heating column to be read.

The liquid in the heating column is rapidly converted into foam, which rises in the upper part of the heating column, parting with the solvent in vapour form, until the residue, consisting of oil and grease, overflows through the outlet holes 36, to collect in the lower part of the separating column 38. From the separating column the residue flows through a pipe 82 into the space between two concentric tubes 84 supported within a casing 86, through which water is circulated, this assembly constituting an oil cooler similar in construction to the condenser 50. The cooled oil residue is discharged through a pipe 88.

Cooling water under pressure is supplied through a pipe 90, from which it enters the casing 86 by way of a stopcock 92. From the top of the casing the water flows through the pipe 58 to the lower end of the casing 52 of the condenser.

The regulating valve 28 is operated by water pressure, the water being supplied from a pressure regulator 89 through pipes 91, 93 by way of a valve in the control unit 30, actuated by the element 32. When the temperature in the column 24 rises, the valve is opened to admit water to the diaphragm or the like which actuates the valve 28, thus opening that valve. When the temperature falls, the supply of water is cut off and the diaphragm is connected to an outlet pipe 95. The valve 28 then closes partly under the action of a spring. This thermostatically controlled regulating valve is a well known device and therefore no detailed description of it is necessary.

A float 94 in one of the tank sections 12 operates a switch, indicated at 96, in the circuit of the heating element 26. This switch is closed when the float 94 rises, but is opened when the tank empties. Consequently the apparatus starts up automatically when contaminated solvent is poured into the tank 12, as soon as the level reaches a predetermined height, and when the tank is empty the heating element is cold. Sludge may be removed from the tank sections through drain pipes 99.

The heating and separating columns are enclosed in a casing 39 and heat-insulating lagging material occupies the space between the columns and the casing.

The modified form of apparatus shown in Figures 4 and 5 is generally similar to that described with reference to Figures 1 to 3, except that there is no pre-heater and no thermostatic control unit. The various parts are enclosed in a casing 11, and those elements which correspond to the elements of the first form of the apparatus are indicated by the same reference numerals. It will be noticed that in the condenser 59 the condensing element consists of only one tube 54, the inner tube 56 being omitted. Similarly in the oil cooler only one tube 84 is used. The separating column 38 differs from that shown in Figures 1 to 3 in that its lower part 49 is of reduced diameter. Again, the heating column 24 is extended upwardly beyond the top of the heating element 26 considerably farther than in the construction first described. There is only one tank 12 and the strainer 20 is placed within the tank, which has a drainage cock 15 to allow sludge and the like to be drained off.

The main distinguishing feature of this alternative construction is that the flow of liquid from the tank 12 to the heating column 24 is controlled, not by a thermostatically actuated regulating valve, but by a float valve 100 controlled by a float 102 in a float chamber 104 communicating with a pipe 106, which leads at its lower end into the lower part of the heating column 24 and at its upper end into the top of the separating column 38. The object of this is to equalize pressure above and below the heating column, thereby preventing surging.

The float valve 100 maintains the level of liquid in the heating column 24 just above the top of the heating element 26, and, as in a caurburettor, the rate of flow of liquid into the heating column is always equal to the rate at which it is vaporized. The still is therefore self-regulating and, as in the earlier construction, it starts up when liquid is poured into the tank 12 by reason of the switch 96 being closed by the raising of the float 94—the switch being opened to interrupt the circuit through the heating element when the tank 12 empties.

The height of the overflow openings 36 above the top of the heating element 26 is adjusted in accordance with experiments, in order that when the liquid foams in the upper part of the heating column the constituents of the solvent having the highest boiling point will not be lifted high enough up the heating column to escape from the openings 36 in liquid form. The dissolved impurities, however, remain in the liquid form when they reach the openings 36, and they therefore pass through these openings and flow down into the annular space between the heating column 34 and the part 39 of the separating column.

It will be appreciated that an industrial solvent, such as kerosene, may have a difference of 100° F. between its initial and final boiling points, and in order to distil the whole of the kerosene from the contaminating oil it is necessary to operate the still at the top boiling point of the range. The foaming of the liquid lifts the liquid up the heating column and the degree of lift naturally rises as the temperature rises; the aforesaid height must correspond to the degree of lift produced at the top boiling point of the solvent. If this height is correctly chosen the temperature of the liquid at the top of the heating element will rise to the boiling point of the heaviest constituent of the solvent and will remain at that temperature.

In this modified form of apparatus the stopcock 92, Figure 3, is replaced by a solenoid-operated valve 93, which is normally closed, the solenoid being in series with the switch 96. It is therefore normally de-energized, but is energized when the float 94 rises, thereby opening the valve and admitting cooling water through the pipe 90, first to the cooler 84, 86 and then to the condenser 50. It is evident that a solenoid-operated valve such as 93 may be employed in the form of apparatus described with reference to Figures 1 to 3.

A thermostatic switch, indicated at 108, has its temperature-responsive element in contact with the heating column 24 and its switch elements connected in series with the heating element 26 and the float-operated switch 96, and in parallel with the solenoid of the valve 93. This switch 108 is arranged to open the heating circuit if, owing to the failure of some part of the apparatus, the temperature in the heating column should rise unduly. This excess temperature switch can be employed also in the arrangement first described.

What I claim is:

1. A still for separating constituents of a liquid, comprising a vertical heating column having an overflow opening adjacent its top, a separating column communicating with and extending above said overflow opening, a trap chamber communicating with the separating column and with the overflow opening and extending below the latter for receiving liquid issuing therefrom and from the separating column, means for supplying liquid to the heating column arranged for maintaining the hydrostatic level of liquid in the column at a predetermined distance below the overflow opening, and means for heating the liquid in the heating column.

2. A still for separating constituents of a liquid according to claim 1, wherein the separating column has a lower portion surrounding and spaced from the upper portion of the heating column and extends below the said overflow opening to form the trap chamber.

3. A still for separating constituents of a liquid according to claim 1, wherein the liquid-supplying means includes a float chamber arranged alongside the heating column and extending above and below the predetermined level at which the liquid in the heating column is to be maintained, said chamber being connected with the heating column below said level by an open passage, a valve controls delivery of liquid to said chamber, and a float is arranged in the chamber to operate the valve and maintain the liquid in the chamber at said predetermined level.

4. In a still for separating constituents of a liquid including a heating column having an overflow opening adjacent its top, a separating column communicating with the overflow opening, means for supplying liquid to be separated to the heating column, and means for heating liquid in the heating column; the combination of a trap chamber arranged to receive liquid issuing from the overflow opening and from the separating column, said chamber extending below the overflow opening, and means controlling the liquid supplying means and arranged to maintain the hydrostatic level of the liquid within the heating column at a predetermined distance below the outlet opening.

JOSEPH SEEBOHM ROWNTREE.

REFERENCES CITED

The following references are of record in the file of this patent:

UNITED STATES PATENTS

| Number | Name | Date |
|---|---|---|
| 2,240,952 | Hetzer | May 6, 1941 |
| 199,006 | Wallace | Jan. 8, 1898 |
| 1,864,021 | Jack | June 21, 1932 |
| 127,797 | Ring | June 11, 1872 |
| 2,071,693 | Hines | Feb. 23, 1937 |
| 1,614,877 | Clapp | Jan. 18, 1927 |
| 2,079,897 | Brown | May 11, 1937 |
| 1,379,631 | Kells | May 31, 1921 |
| 2,192,879 | Brown | May 12, 1940 |
| 1,948,357 | Newkirk | Feb. 20, 1934 |
| 1,673,374 | Peters | June 12, 1928 |
| 2,330,057 | Hunter | Sept. 21, 1943 |
| 1,735,980 | Sadtler | Nov. 19, 1929 |

FOREIGN PATENTS

| Number | Country | Date |
|---|---|---|
| 214,160 | Switzerland | July 1, 1941 |